United States Patent
Horesh

(10) Patent No.: US 11,756,277 B1
(45) Date of Patent: Sep. 12, 2023

(54) NETWORK PLATFORM IMPERSONATION MITIGATION SYSTEMS AND METHODS

(71) Applicant: INTUIT INC., Mountain View, CA (US)

(72) Inventor: Yair Horesh, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/173,658

(22) Filed: Feb. 23, 2023

(51) Int. Cl.
*G06T 19/00* (2011.01)
*G06F 3/01* (2006.01)
*G06T 15/04* (2011.01)

(52) U.S. Cl.
CPC ............ *G06T 19/006* (2013.01); *G06F 3/011* (2013.01); *G06T 15/04* (2013.01); *G06T 19/00* (2013.01)

(58) Field of Classification Search
None
See application file for complete search history.

(56) References Cited

U.S. PATENT DOCUMENTS

| 11,010,951 B1* | 5/2021 | Schwartz | G06F 3/012 |
| 2019/0035149 A1* | 1/2019 | Chen | G06V 40/166 |
| 2022/0253126 A1* | 8/2022 | Holland | G06F 3/011 |

OTHER PUBLICATIONS

Essam, "Image Similarity Estimation Using a Siamese Network with a Triplet Loss", https://keras.io/examples/vision/siamese_network/#introduction, Mar. 25, 2021, 8 pages.

* cited by examiner

*Primary Examiner* — Tapas Mazumder
(74) *Attorney, Agent, or Firm* — DLA PIPER LLP (US)

(57) ABSTRACT

A processor may receive an image of a user and an avatar representing the user within a computing environment. The processor may generate a score for the avatar on the basis of its resemblance to the image using a machine learning (ML) process. The processor may configure at least one option for action by the user within the computing environment according to the score.

20 Claims, 5 Drawing Sheets

NETWORK PLATFORM IMPERSONATION MITIGATION SYSTEMS AND METHODS

BACKGROUND

Persistent, online virtual worlds have been introduced in recent years, and others are under development. Broadly speaking, these virtual spaces may be referred to as the "metaverse." Users may be able to customize the appearance of virtual avatars they use to traverse the metaverse. In some contexts, these virtual avatars might have any kind of appearance, from the realistic to the fanciful. In other contexts, it may be important or desirable to map a virtual avatar to the real appearance of the real user or to some other appearance standard.

BRIEF DESCRIPTIONS OF THE DRAWINGS

DETAILED DESCRIPTION OF SEVERAL EMBODIMENTS

Systems and methods described herein can determine whether a virtual avatar corresponds to the real appearance of a real user or to some other appearance standard. Systems and methods described herein can further configure options within the metaverse and/or a user interface (UI) associated therewith based on such determinations.

For example, under the assumption the metaverse platform has at least one real picture of a user (e.g., an employee photo), embodiments described herein can train a Siamese network or other machine learning (ML) process to capture the distance between real pictures and their matching avatars. If a user's avatar is very far from the real image, some policy can be triggered. For example, the policy can include having the platform's administrator alerted and/or configuring one or more options within the platform.

The disclosed embodiments can deal with the unique situation within the metaverse platform where an avatar is required to comply with a standard. For example, this can improve security and data trustworthiness within the platform. Specific technical details and examples are presented below with respect to the embodiments shown in the figures.

Figure 1:
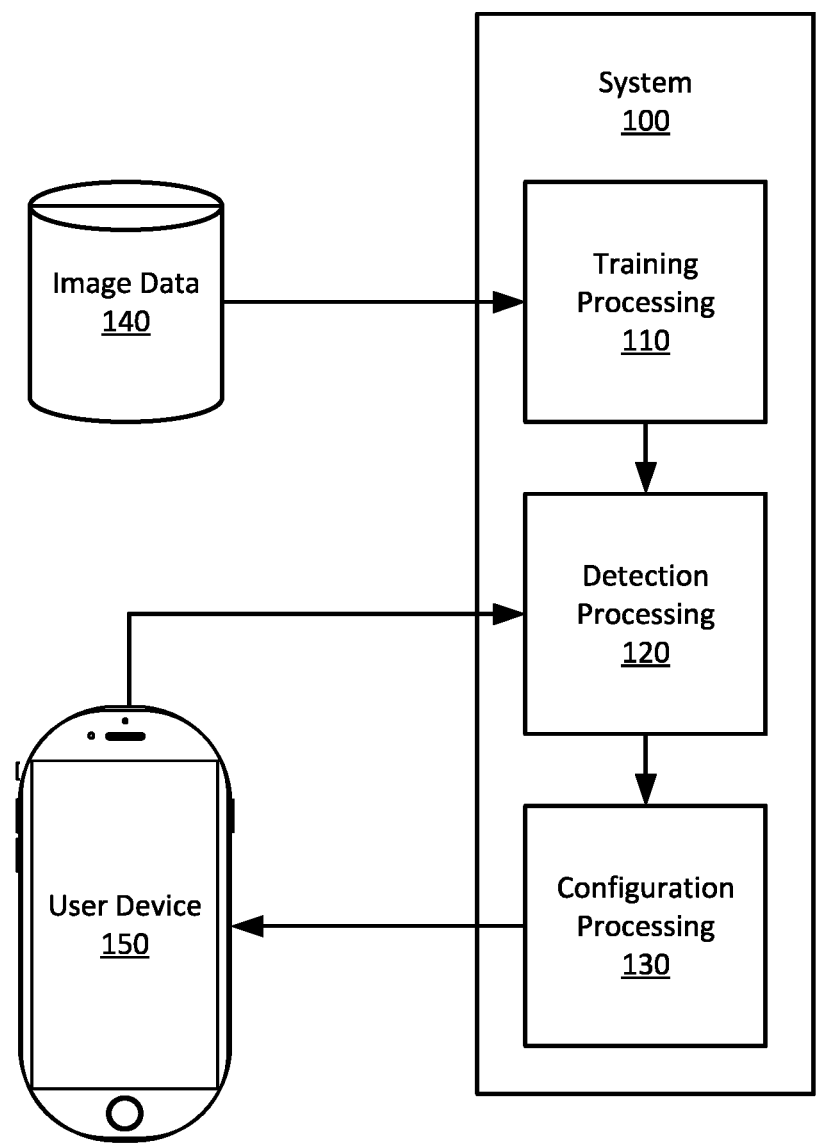
FIG. 1 shows an example avatar evaluation system according to some embodiments of the disclosure.

FIG. 1 shows an example avatar evaluation system 100 according to some embodiments of the disclosure. System 100 may include a variety of hardware, firmware, and/or software components that interact with one another. Some components may communicate with client(s), such as user device 150, and/or data sources, such as image data source 140, through one or more networks (e.g., the Internet, an intranet, and/or one or more networks that provide a cloud environment). Some components may communicate with one another using networks. Each component may be implemented by one or more computers (e.g., as described below with respect to FIG. 5).

Figure 3:
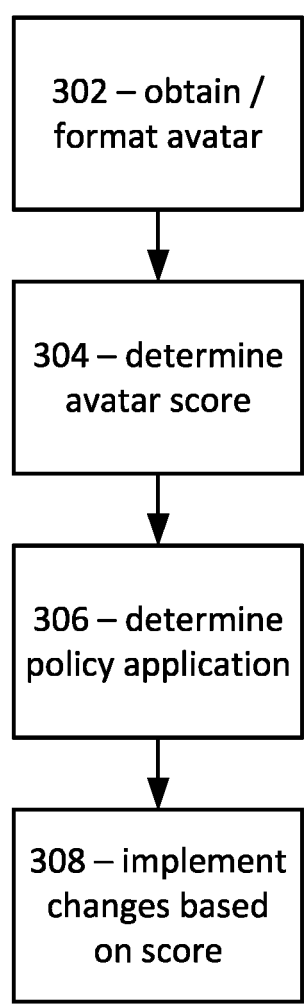
FIG. 3 shows an example avatar evaluation process according to some embodiments of the disclosure.
Figure 4:
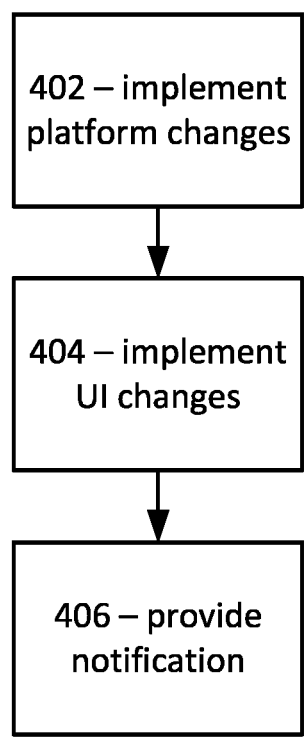
FIG. 4 shows an example configuration and/or notification process according to some embodiments of the disclosure.

As described in detail below, system 100 can perform processing to train one or more models for image analysis using training processing 110. With trained model(s) in hand, detection processing 120 can evaluate user avatars for compliance with policies or for other factors. Depending on the outcome of evaluation, configuration processing 130 can configure elements of a metaverse platform or components thereof, which may then be accessed by user device 150 and/or other computing devices. For example, FIGS. 2-4 illustrate the functioning of the illustrated components in detail.

Elements illustrated in FIG. 1 (e.g., system 100 including training processing 110, detection processing 120, and/or configuration processing 130; image data store 140; and/or user device 150) are each depicted as single blocks for ease of illustration, but those of ordinary skill in the art will appreciate that these may be embodied in different forms for different implementations. For example, while training processing 110, detection processing 120, and configuration processing 130 are depicted separately, any combination of these elements may be part of a combined hardware, firmware, and/or software element. Likewise, while training processing 110, detection processing 120, and configuration processing 130 are depicted as parts of a single system 100, any combination of these elements may be distributed among multiple logical and/or physical locations. Also, while one image data store 140, one user device 150, and one system 100 are illustrated, this is for clarity only, and multiples of any of the above elements may be present. In practice, there may be single instances or multiples of any of the illustrated elements, and/or these elements may be combined or co-located.

In the following descriptions of how system 100 functions, several examples are presented. These examples are in the context of evaluating avatars for user accounts in the context of comparing the avatars with the real appearance of the user(s). However, those of ordinary skill in the art will appreciate that these examples are merely for illustration, and system 100 and its methods of use and operation are extendable to other application and data contexts.

Figure 2:
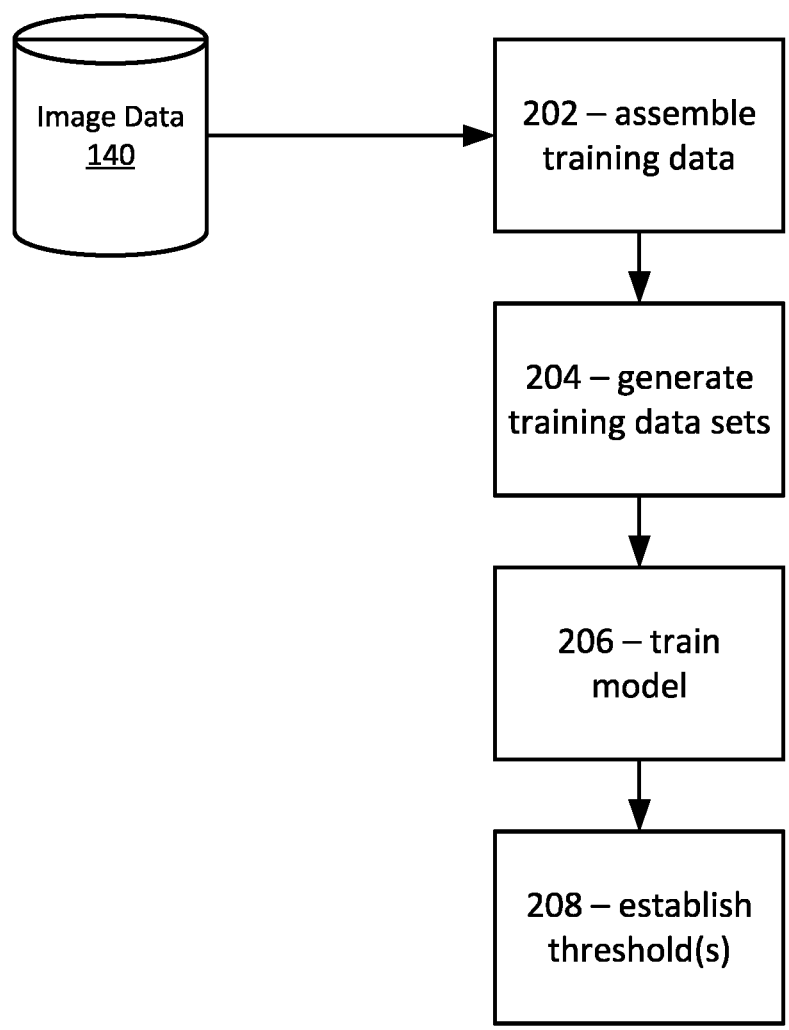
FIG. 2 shows an example system preparation process according to some embodiments of the disclosure.

FIG. 2 shows an example system preparation process 200 according to some embodiments of the disclosure. System 100 (e.g., training processing 110 of system 100) can perform process 200 to configure system 100 prior to runtime and/or to update system 100 during or after runtime. As an illustrative example, system 100 can use process 200 to train a Siamese network or other ML process to evaluate metaverse avatars.

At 202, training processing 110 can assemble training data. The training data can include both a set of images (e.g., user images from image data store 140) and a set of avatar images. The avatar images may be selected according to whether they are in compliance with the policy to be evaluated by system 100. For example, if a policy requires the avatar to match the user image, under the assumption that most users have an avatar that has a fair resemblance to them, training processing 110 can collect users' real pictures and their avatars. In some cases, an administrator or other user may be able to evaluate the training data prior to advancing to the next stage of process 200 in order to check compliance of the avatar with the policy (e.g., confirm the avatars resemble the users).

At 204, training processing 110 can generate training data sets. For example, training processing 110 can generate two training data sets, one that includes pairs of user photos and their own avatar images, and another that pairs a user photo with a randomly chosen or otherwise non-matching avatar image. Thus, the resulting training data sets may include a first training data set comprising data with images and avatars selected to match one another and a second training data set comprising data with greater expected distances between images and avatars than expected distances of the first training data set. In some embodiments, such as those where the ML process comprises a Siamese network, two training sets may be used to train the Siamese network or ML process according to the requirements of such Siamese network or ML process.

At 206, training processing 110 can train an ML model. For example, training processing 110 can train a Siamese network with pairs of images from the two training data sets shuffled. As those of ordinary skill in the art will appreciate, with a Siamese network, the first set of pairs from the first training data set is trained to have a small distance (e.g., 0 or nearly 0) and the second set of pairs from the second training data set is trained to have a large distance given a pair (e.g., 1 or nearly 1). Moreover, while a Siamese network is given as an example of an ML process that training processing 110 may train, other ML types may be used. For example, a triplet loss version or variation of a Siamese network can also be applied (e.g., a known or novel Siamese network architecture with a triplet loss function having three sets of images shuffled, two similar pairs and one unrelated pair, which may use a triplet loss function such as $L(A, P, N)=\max(||f(A)-f(P)||^2-||f(A)-f(N)||^2+\text{margin}, 0)$ or similar).

At 208, training processing 110 can establish threshold(s) for the model. For example, training processing 110 can establish a threshold distance below which an avatar will be considered to be similar enough to a photo to trigger (or avoid triggering) a policy. As described in detail below, configuring the metaverse platform or elements thereof can be performed according to whether the score is above or below the threshold distance. In some embodiments, the threshold can be set automatically (e.g., setting a threshold that has some percentage of generated scores above or below), whereas in other embodiments, an admin or other user can set a threshold value.

FIG. 3 shows an example avatar evaluation process 300 according to some embodiments of the disclosure. System 100 (e.g., detection processing 120 and configuration processing 130 of system 100) can perform process 300 to evaluate avatars that have been submitted and/or that are in use by metaverse users and configure one or more metaverse elements based on the evaluation. As an illustrative example, system 100 can use a Siamese network or other ML process trained according to process 200 to evaluate metaverse avatars.

At 302, detection processing 120 can obtain and, if necessary, format an avatar for processing. For example, detection processing 120 can perform batch processing and select multiple user avatars, or detection processing 120 can process avatars upon creation or submission by individual users. In any event, if the size or resolution of the avatar is different from the image size used for the training data, detection processing 120 can resize the avatar or generate a snapshot of the avatar that has dimensions that are the same as those used in the training data.

At 304, detection processing 120 can determine the score of the avatar being processed (or a set of scores in the case of batch processing, wherein the following processing can be repeated for each avatar). That is, detection processing 120 can evaluate an avatar representing a user using the ML process, where the evaluating comprises generating a score for the avatar on the basis of its resemblance to an image of the user. For example, in the case of the Siamese network, the triplet loss version of the Siamese network, or other ML model, the avatar may be used as input into the ML process. Additionally, an image against which the avatar is being evaluated, such as a real image of the user, may be a second input into the ML process. The outcome of processing using the ML process may include a score indicating a distance between the two inputs (e.g., indicating a similarity between the avatar and the image).

At 306, configuration processing 130 can determine whether and/or how to configure at least one option for action by the user within the metaverse platform, based on the score and one or more policies. For example, configuration processing 130 may define one or more policies, or access stored data defining the one or more policies. The one or more policies may indicate whether some configuration should be performed or not performed depending on whether the score is above or below the threshold for each respective one or more policy. For example, configuration processing 130 can compare the score with the threshold(s) and identify any policies and/or changes that are triggered by the score determined for the avatar being processed.

At 308, configuration processing 130 can implement changes based on the score that was determined at 306 as described above. For example, configuration processing 130 can configure at least one option for action by the user within the computing environment according to the score. Any kind of user action options may be configured by this processing, and the following examples may be used in some embodiments.

In one example, the configuring may include restricting the at least one option in response to the score indicating a difference between the image and the avatar greater than a threshold distance. For example, configuration processing 130 can restrict options for the user to choose a name when the avatar does not match their photo, with the expectation that requiring the user's real name will prevent attempts at the user impersonating someone else through the use of a misleading avatar. In another example, configuration processing 130 can restrict options for the user to perform certain actions within the metaverse platform, such as visiting certain sections thereof, when the avatar does not match their photo. In principle, any configuration of user options is possible at this stage.

Alternatively or additionally, such configuring may include requiring at least one additional indicia of identity from the user in response to the score indicating a difference between the image and the avatar greater than a threshold distance. For example, configuration processing 130 can cause user device 150 to prompt the user to provide some kind of proof of identity that can be used within the metaverse to prevent attempts at the user impersonating someone else through the use of a misleading avatar.

Moreover, actions other than configuring user action options may be performed based on the score that was determined at 306 as described above. For example, configuration processing 130 can generate an alert in response to the score indicating a difference between the image and the avatar greater than a threshold distance. The alert may be sent to an admin and/or to the user, for example as a message sent through a network to an admin UI of an admin computing device (not shown) and/or user device 150. For example, the alert can indicate that the avatar does not resemble the user's image and therefore is not allowed by a metaverse platform policy requiring a reasonable similarity between the avatar and the image. The admin may be given options for blocking the user, communicating with the user, blocking adoption of the avatar by the user, etc., for example. The user may be given an explanation of the policy and/or an interface for editing the avatar, for example.

FIG. 4 shows an example configuration and/or notification process 400 whereby configuration processing 130 can implement changes at 308 of process 300 according to some embodiments. Configuration and/or notification process 400 may include making changes to metaverse platform device configuration and/or user device 150 configuration and/or generation and transmission of network messages.

At 402, configuration processing 130 can implement any changes to the metaverse platform itself that are necessary to effect changes based on the score that was determined at 306 as described above. In embodiments wherein system 100 is integrated within the metaverse platform, configuration processing 130 may directly change one or more configuration settings of the metaverse platform. In embodiments wherein system 100 is separate from the metaverse platform, configuration processing 130 may cause the metaverse platform to implement a change, for example by making an API call or otherwise sending instructions to the metaverse platform.

At 404, configuration processing 130 can implement any changes to the user device 150 (e.g., the UI thereof) that are necessary to effect changes based on the score that was determined at 306 as described above. For example, in some embodiments configuration processing 130 may push data to the user device 150 that the user device 150 can display within a UI and/or use to modify a setting in a client-side metaverse app or browser used to access the metaverse platform. In some embodiments, configuration processing 130 may implement the changes in server-side data that is served to the user of the user device 150 through the lient-side metaverse app or browser used to access the metaverse platform. In this example, modification may be similar to that at 402, where configuration processing 130 may directly change one or more configuration settings of the metaverse platform or cause the metaverse platform to implement a change, for example by making an API call or otherwise sending instructions to the metaverse platform, depending on whether system 100 is integrated within the metaverse platform or not.

At 406, configuration processing 130 can provide any notifications that are prescribed based on the score that was determined at 306 as described above. Configuration processing 130 may use any known or novel messaging software, hardware, and/or network elements to deliver notifications to the user device 150 or any other device.

Figure 5:
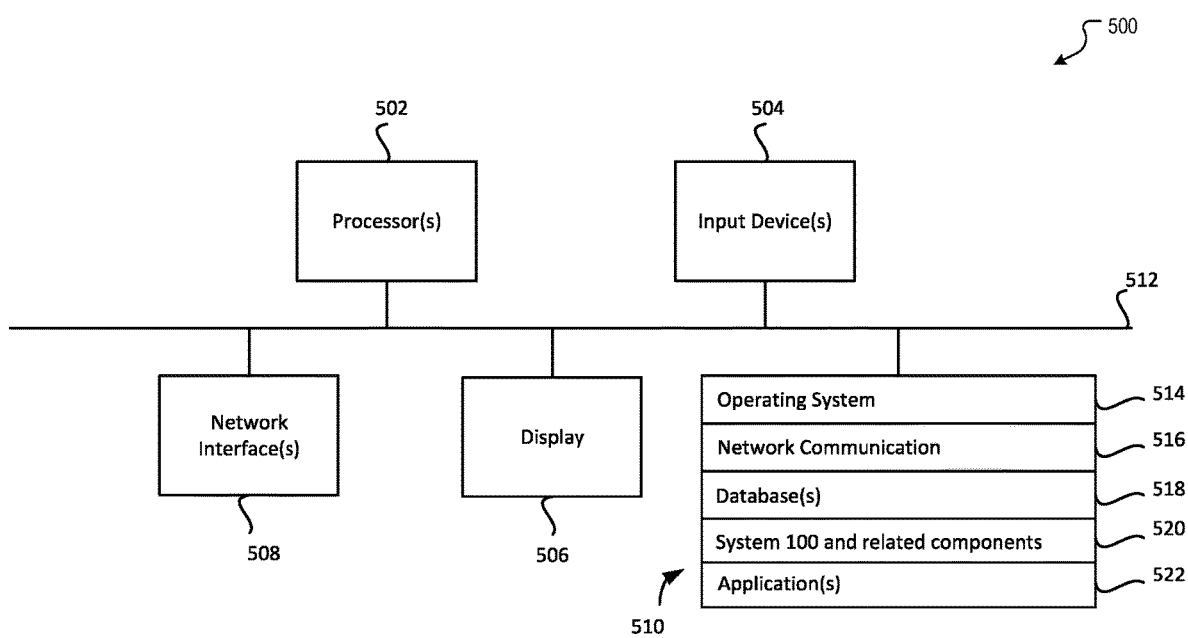
FIG. 5 shows a computing device according to some embodiments of the disclosure.

FIG. 5 shows a computing device 500 according to some embodiments of the disclosure. For example, computing device 500 may function as system 100 or any portion(s) thereof, or multiple computing devices 500 may function as system 100.

Computing device 500 may be implemented on any electronic device that runs software applications derived from compiled instructions, including without limitation personal computers, servers, smart phones, media players, electronic tablets, game consoles, email devices, etc. In some implementations, computing device 500 may include one or more processors 502, one or more input devices 504, one or more display devices 506, one or more network interfaces 508, and one or more computer-readable mediums 510. Each of these components may be coupled by bus 512, and in some embodiments, these components may be distributed among multiple physical locations and coupled by a network.

Display device 506 may be any known display technology, including but not limited to display devices using Liquid Crystal Display (LCD) or Light Emitting Diode (LED) technology. Processor(s) 502 may use any known processor technology, including but not limited to graphics processors and multi-core processors. Input device 504 may be any known input device technology, including but not limited to a keyboard (including a virtual keyboard), mouse, track ball, and touch-sensitive pad or display. Bus 512 may be any known internal or external bus technology, including but not limited to ISA, EISA, PCI, PCI Express, NuBus, USB, Serial ATA or FireWire. In some embodiments, some or all devices shown as coupled by bus 512 may not be coupled to one another by a physical bus, but by a network connection, for example. Computer-readable medium 510 may be any medium that participates in providing instructions to processor(s) 502 for execution, including without limitation, non-volatile storage media (e.g., optical disks, magnetic disks, flash drives, etc.), or volatile media (e.g., SDRAM, ROM, etc.).

Computer-readable medium 510 may include various instructions 514 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 may establish and maintain network connections (e.g., software for implementing communication protocols, such as TCP/IP, HTTP, Ethernet, telephony, etc.).

Database(s) 518 may include data used by system 100 to determine train ML models and/or process avatars as described above. Components 520 may include the system elements and/or the instructions that enable computing device 500 to perform the processing of system 100 as described above. Application(s) 522 may be an application that uses or implements the outcome of processes described herein and/or other processes. For example, application(s) 522 may metaverse apps and/or platform backend services used in combination with and/or by system 100 as described above. In some embodiments, the various processes may also be implemented in operating system 514.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
   receiving, by a processor, a first training data set comprising data with images and avatars selected to match one another and a second training data set comprising data with greater distances between images and avatars than distances of the first training data set;
   training, by the processor, a machine learning (ML) process using the first training data set and the second training data set as training inputs; and
   deploying, by the processor, the ML process within a computing environment, the deploying comprising evaluating an avatar representing a user using the ML process and, based on an outcome of the ML process, configuring at least one option for action by the user.

2. The method of claim 1, wherein:
   the evaluating comprises generating a score for the avatar on the basis of its resemblance to an image of the user using a machine learning (ML) process; and
   the configuring is performed according to the score.

3. The method of claim 2, wherein the configuring comprises restricting the at least one option in response to the score indicating a difference between the image and the avatar greater than a threshold distance.

4. The method of claim 2, wherein the configuring comprises requiring at least one additional indicia of identity from the user in response to the score indicating a difference between the image and the avatar greater than a threshold distance.

5. The method of claim 2, further comprising generating, by the processor, an alert in response to the score indicating a difference between the image and the avatar greater than a threshold distance.

6. The method of claim 1, wherein the ML process comprises a Siamese network.

7. The method of claim 1, further comprising setting, by the processor, a threshold distance based on results of the training, wherein the configuring is performed according to whether the avatar is above or below the threshold distance from an image of the user.

8. A method comprising:
receiving, by a processor, an image of a user and an avatar representing the user within a computing environment;
generating, by the processor, a score for the avatar on the basis of its resemblance to the image using a machine learning (ML) process; and
configuring, by the processor, at least one option for action by the user within the computing environment according to the score.

9. The method of claim 8, wherein the configuring comprises restricting the at least one option in response to the score indicating a difference between the image and the avatar greater than a threshold distance.

10. The method of claim 8, wherein the configuring comprises requiring at least one additional indicia of identity from the user in response to the score indicating a difference between the image and the avatar greater than a threshold distance.

11. The method of claim 8, further comprising generating, by the processor, an alert in response to the score indicating a difference between the image and the avatar greater than a threshold distance.

12. The method of claim 8, wherein the ML process comprises a Siamese network.

13. The method of claim 12, further comprising training, by the processor, the Siamese network using a first training data set comprising data with images and avatars selected to match one another and a second training data set comprising data with greater distances between images and avatars than distances of the first training data set.

14. The method of claim 13, further comprising setting, by the processor, a threshold distance based on results of the training, wherein the configuring is performed according to whether the score is above or below the threshold distance.

15. A system comprising:
a processor; and
a non-transitory memory in communication with the processor and storing instructions that, when executed by the processor, cause the processor to perform processing comprising:
receiving an image of a user and an avatar representing the user within a computing environment;
generating a score for the avatar on the basis of its resemblance to the image using a machine learning (ML) process; and
configuring at least one option for action by the user within the computing environment according to the score.

16. The system of claim 15, wherein the configuring comprises restricting the at least one option in response to the score indicating a difference between the image and the avatar greater than a threshold distance.

17. The system of claim 15, wherein the configuring comprises requiring at least one additional indicia of identity from the user in response to the score indicating a difference between the image and the avatar greater than a threshold distance.

18. The system of claim 15, wherein the ML process comprises a Siamese network.

19. The system of claim 18, wherein the processing further comprises training the Siamese network using a first training data set comprising data with images and avatars selected to match one another and a second training data set comprising data with greater distances between images and avatars than distances of the first training data set.

20. The system of claim 19, wherein the processing further comprises setting a threshold distance based on results of the training, wherein the configuring is performed according to whether the score is above or below the threshold distance.

* * * * *